United States Patent [19]
Lemelson

[11] Patent Number: 5,349,265
[45] Date of Patent: Sep. 20, 1994

[54] SYNTHETIC DIAMOND COATED ELECTRODES AND FILAMENTS

[76] Inventor: Jerome H. Lemelson, 868 Tyner Way, Incline Village, Nev. 89450

[21] Appl. No.: 852,308

[22] Filed: Mar. 16, 1992

Related U.S. Application Data

[63] Continuation-in-part of Ser. No. 494,690, Mar. 16, 1990, Pat. No. 5,132,587.

[51] Int. Cl.⁵ .............................................. H01J 19/06
[52] U.S. Cl. .................................... 313/345; 313/355; 313/311; 313/315
[58] Field of Search ............... 313/345, 355, 311, 315, 313/574, 580, 631, 130, 141

[56] References Cited

U.S. PATENT DOCUMENTS

| | | | |
|---|---|---|---|
| 3,604,970 | 9/1971 | Campbell et al. | 313/355 X |
| 3,826,946 | 7/1974 | Hammer et al. | 313/311 X |
| 4,084,942 | 4/1978 | Villabos | 313/311 X |
| 5,132,587 | 7/1992 | Lemelson | 313/141 |

Primary Examiner—Michael Horabik

[57] ABSTRACT

Structures in electrodes such as filaments for electric lamps and the like are subject to heat corrosion and/or erosion or evaporation during use. The electrodes are coated with synthetic diamond which serves to protect the operating or exposed portion or portions of the electrodes from corrosion and/or erosion. Where the electrode is a filament employed to generate and emit radiation including light energy for illumination, the coating is thin enough to be transmissive of the light energy generated when the electrode is electrically energized. Similarly if the electrode is used in the generation of an arc or electron beam, the synthetic diamond coating serves to protect the core material of the electrode from erosion and/or corrosion while permitting the radiant energy to be transmitted therethrough. If the electrode is a filament in a light bulb, the side wall and end wall thereof heated to incandescense are coated with such protective light transmitting material. In a modified form, the entire electrode is made of carbon.

18 Claims, 1 Drawing Sheet

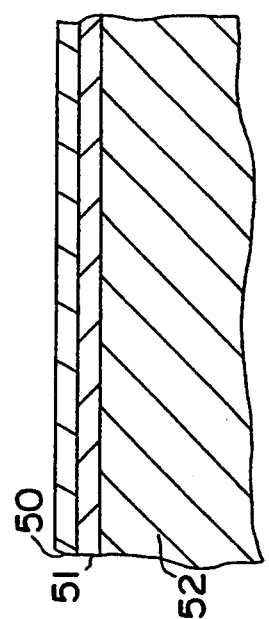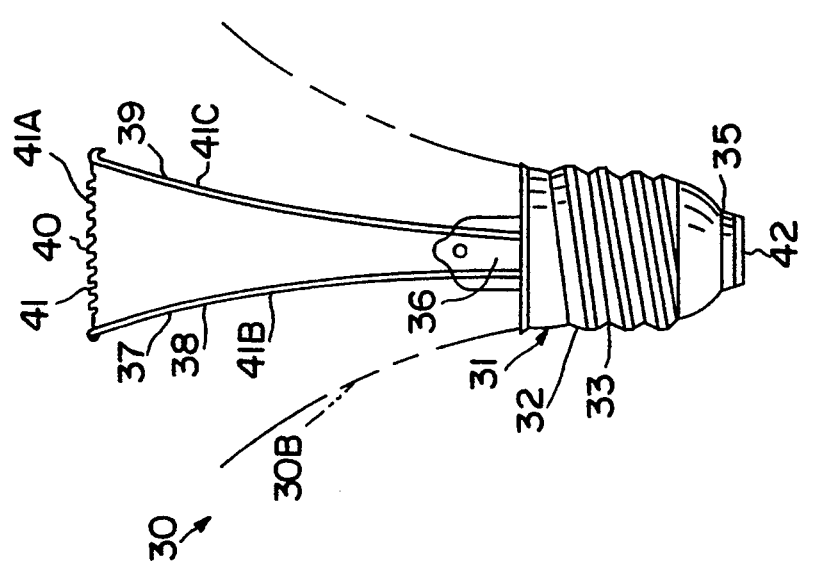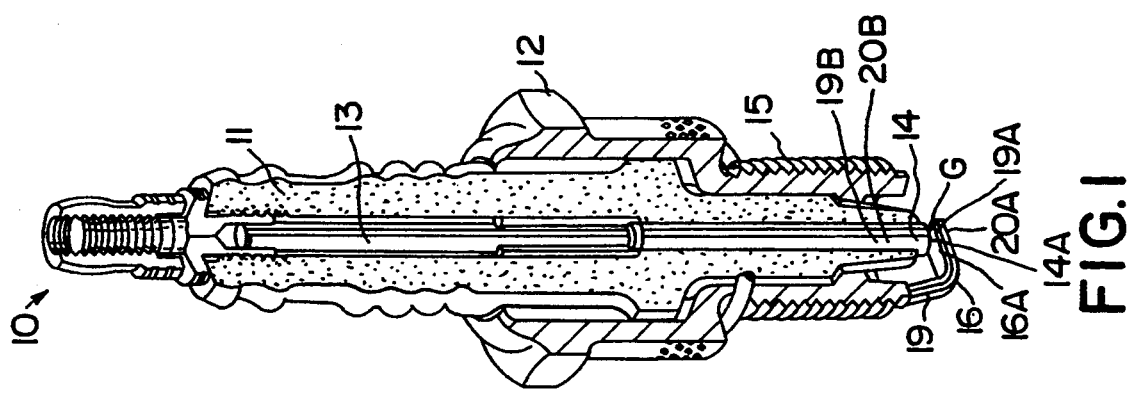

SYNTHETIC DIAMOND COATED ELECTRODES AND FILAMENTS

This is a continuation-in-part of application 07/494,690 filed Mar. 16, 1990 now U.S. Pat. No. 5,132,587.

SUMMARY OF THE INVENTION

This invention relates to new and improved structures in electrodes for use in electrical equipment, internal combination engines, electric lamps and the like, which are normally subject to heat, corrosion and, in certain instances, to chemical corrosion caused by a chemical process, such as combustion or other process which generally takes place at high temperature caused either by an electrical discharge and/or by combustion of a fuel. In a particular form of the invention, all or select portions of the side and center electrodes of a spark plug are coated with a thin film of synthetic diamond material deposited in situ thereon and operable to protect the electrodes from pitting or electrical discharge erosion and/or chemical corrosion effected at high temperature during the combustion process. Other forms of the invention include the application of such a synthetic diamond material to electrodes and filaments of light emitting devices such as incandescent lamps, glow discharge lamps and the like. In certain instances, to further protect the filaments or electrodes from erosion and corrosive effects during use, an overcoating of a thin layer of chromium is applied directly against the outer surface of the synthetic diamond film coating the electrodes or filaments.

In a preferred form of the invention, the diamond film is formed in situ on the electrode to a depth of less than 0.001" whereby it will protect the surface of the electrode which is normally subject to spark or plasma generated erosion during discharge of electrical energy from the electrode to a cathode or opposed electrode such as employed in electron beam discharge devices, incandescent lamps and the like and spark plugs. In certain applications involving high voltage and current, the synthetic diamond coatings may be applied in coating thicknesses greater than 0.001", though in most coating thicknesses in the range of 0.0001" to 0.001" will suffice.

Accordingly it is a primary object of this invention to provide a new and improved structure in an electrode for an electrical device.

Another object is to provide an improved structure in a filament for a lamp or the like.

Another object is to provide new and improved structures in spark plug electrodes which permit same to operate over longer periods of time with less pitting and erosion caused by high temperatures and electrical discharges therebetween.

Another object is to provide improved structures in electrodes and lamp filaments which are coated with thin films of synthetic diamond material operable to protect the base metal and wherein further coating of chromium or other metal is applied over the diamond film to protect same during use.

Another object is to provide improvements in electrodes lamp filaments and the like which are partly coated with synthetic diamond material for protecting same against corrosion and erosion during use, wherein a select portion or portions thereof are void of such coating to control the nature and/or location of the discharge.

With the above and such other objects in view as may hereinafter more fully appear, the invention consists of the novel structures, article constructions and methods described in the following specification and illustrated in the accompanying drawings, but it is to be understood that variations and modifications may be resorted to which fall within the scope of the invention as claimed without departing from the nature and spirit of the invention.

BRIEF DESCRIPTION OF THE DRAWINGS

FIG. 1 is an isometric view with parts broken away and sectioned for clarity of a spark plug having features of the instant invention and FIG. 2 is a depiction of an incandescent lamp constructed in accordance with the present invention and FIG. 3 is a fragmentary view in cross section of a portion of composite material of the type employed in FIG. 1 or in other articles of manufacture such as described in the specification.

In FIG. 1 is shown an improved assembly defining an electrode device 10, such as a spark plug for use in internal combustion engines, burners and the like. Similar constructional details or modifications of those shown in FIG. 1 may be employed in the fabrication of other electrode containing devices having one or more electrodes which are subject to high temperature, chemical and electrical corrosion caused by plasma and spark discharge and, in certain instances, by resulting chemical action, such as combustion adjacent thereto.

The spark plug 10 is assembled with an insulator portion 11 and a metal shell portion 12 surrounding the insulator portion at one end thereof. A rod-like metal terminal 13 extends longitudinally through the insulator portion and is secured at its end to or defines the center electrode of the spark plug.

The lower threaded portion 15 of the shell 12 has a side electrode 16 welded thereto and extending across the end 14 of the center electrode 13 defining a gap therebetween, across which gap high voltage electrical energy is discharged during operation, to generate plasmas or sparks. Notation 19 refers to a synthetic diamond or diamond-like coating applied to either or both the side electrode 16 and the center electrode 13 or just the end portion 14 and 17 thereof across which a spark or electrical discharge is effected during the operation of the spark plug or electrode assembly.

In a particular form of the invention, substantially all surface areas of the center electrode 13 and the side electrode 16 or just the exposed portions thereof are so coated with synthetic diamond-like material to the exclusion of respective small portions of the exposed areas thereof defining the gap G therebetween. The gap may thus have opposing wall portions formed of the metals of the center and side electrodes while plated with high temperature resistant material, such as chromium or chromium alloys. The remaining portions of the electrodes which are coated with such synthetic diamond material are thus protected against heat, electrical and-/or chemical erosion during use.

Notation 20 refers to an overcoating of a protection material, such as chromium or chromium alloy, deposited against those portions of the electrodes containing synthetic diamond coatings and, in certain instances, across one or more portions of each of the electrodes which are void of such synthetic diamond coating material.

In a modified form of spark plug a select portion of the surface of the center electrode and or the side electrode which face each other across the gap are void of the synthetic diamond material or contain same in a thickness such that the discharge of a spark or arc therebetween may be operatively effected during engine operation without misfiring. Depending on voltage applied, synthetic diamond film thickness at the gap location may vary from between 0.00001" to 0.001" and may either be of constant thickness or may increase along other portions of the electrodes. Such thin film containing portions or areas void of diamond material may comprise the end face of the center electrode 13 and/or an equal area of the side electrode 16 face the end of the center electrode. To increase the number of arcs or sparks generated, such diamond coating may be applied to either or both electrodes as a series of space separated narrow bands of thickness such that a plurality of spark or arc discharges will occur therebetween each time high voltage is applied to the center electrode. While notations 19 and 20 refer generally to the respective synthetic diamond coating and chromium overcoating, notations 19A and 20A define such materials covering the surfaces of the side electrode 16 while 19B and 20B to such materials covering the surfaces of the center electrode 13.

Also shown in FIG. 1 is a sealing ring or washer 22 disposed between the threaded lower end 15 and a stepped portion of the metal shell 12 to provide a pressure seal between the plug and the combustion chamber. Such sealing ring may be made of solid metal, such as copper or formed metal sheet or tube and may be coated with a thin layer, as described, of synthetic diamond material applied thereto per se or having an overcoating of a protective metal such as chromium or other metal as described to strengthen, protect and insulate the sealing ring.

In a modified form of the invention, it is noted that filaments of electrical resistance material, such as tungsten filaments and the like employed in incandescent lamps, may be formed of such material coated with a synthetic diamond material having an overcoating of chromium or the like, as described so as to greatly enhance the life of such filaments and increase the timed failure caused, for example, by the expansion and contraction of the material when the lamp is energized and de-energized. A tungsten filament for a conventional light bulb may be coated with synthetic diamond film per se along its entire length to a thickness in the range of 0.0001" to 0.001" depending on its size and the application parameters thereof. Similarly, the base or support for such filament, if not glass, may be coated with diamond film of similar thickness as may any fastening or operational devices attached to the filament within the lamp enclosure.

The terminals of incandescent lamps, lamp sockets and connectors may be similarly coated with thin diamond film material to protect same against moisture and chemical corrosion as well as erosion due to arcing or current discharge.

Electrodes employed in other forms of lamps, radiation emitting devices, cathode ray tubes, fuel cells and batteries may be similarly coated with thin film synthetic diamond material varying from 0.0001" to 0.001" depending on the voltage and amperage ranges applied thereto and other operating parameters.

In FIG. 2 is shown an incandescent lamp 30 having a base or socket assembly 31 which is secured to and supports a glass envelope or bulb 30B which extends upwardly therefrom and defines an enclosure surrounding a filament assembly 36; the enclosure being evacuated of air or filled with a suitable gas. The socket assembly 31 has a side wall defined by a cup shaped sheet metal ferrule 32 made of aluminum or an aluminum alloy and having a threaded side wall 33 with a bottom wall portion 34 which has a central opening 35 to the rim of which is sealed the bottom end 37 of a glass or ceramic molding 36 which is secured to and supported within and between the side wall 33 of the ferrule 32. The glass molding 36 seals the lower portions of a pair of upwardly extending filament support metal wires 38 and 39 which form part of a filament assembly 37 and support a thin wire filament 40 such as a fine coil of tungsten wire which extends between the upper ends of the wires 38 and 39.

A coating 41 of synthetic diamond or diamond-like material may be applied, as described, to the entire filament assembly or at least the portion of the assembly extending into the air evacuated volume defined by the glass envelope or bulb and the support 31. In other words, that part of the filament assembly which extends beyond the upper end 36A of the glass molding 36 is preferably totally coated with synthetic diamond material although just the filament 40 thereof which is resistively heated to incandescence may be so coated to protect it from failure due to corrosion and erosion. Notation 41A refers to the synthetic diamond or diamond-like material containing the filament 41; 41B and 41C to those portions of the diamond coating applied to the wires 38 and 39. If the assembly 37 is coated with diamond film prior to assembling it to the glass molding 36, lower ends of the wires 38 and 39 may be masked to permit them to be respectively soldered or welded to the wall 33 of the ferrule and a disc 42 which defines a contact terminal at the bottom of the lamp or the diamond material coating such lower ends may be mechanically or chemically removed therefrom to permit such electrical assembly. If the thin coiled wire 40 is so coated to the exclusion of the spaced-apart wires to the ends of which the filament ends are attached, suitable electrical energy may be passed through the coating 41A on the filament to the filament core 40 or may be passed through non-coated end portions of the filament to permit it emit light. By coating the entire exposed portions of the assembly 37 with such synthetic diamond material all portions of all the metal components thereof will be protected against corrosion and erosion such as evaporization, thus greatly reducing or eliminating contamination of one component with atoms of one or more of the other components. Furthermore, if the filament 40 is so coated and protected from corrosion and the escape of its atoms the the envelope volume, metals such as copper, aluminum, titanium, iron or alloys thereof, which are less costly than tungsten and exhibit greater flexure and strength than such commonly used metal, may be used for the filament.

Various other filament and electrode configurations and assemblies used in electric light and other electrically energized devices for generating radiation, such as light energy by incandescence, glow discharge, electron emission or other means, may may be entirely or partly coated with diamond or diamond-like material as described to protect all or selected portions of such devices from corrosion and/or erosion during use. To effect such synthetic diamond coatings, the surface or surface of the core element or elements may be etched or otherwise specially prepared such as by applying a suitable subcoating thereto prior to the application of the synthetic diamond coating or coatings. In a specific fialment construction, the core of such composite filament or electrode may be made of a carbonized polymer or high strength carbon rod, wire or filament or group of filaments formed prior to or after the diamond coating operation. In a specific fabrication technique, a suitable carbon atoms containing polymer may be subject to microwave radiation to carbonize same to form a core resistance heating element thereof while or just before the same or auxilliary microwave radiation is employed to effect the deposition of carbon atoms and form diamond film or to form the surface stratum of the core into a synthetic diamond layer.

The coatings of synthetic hard diamond or diamond-like material applied to the entire articles or select portions of such articles subjected to frictional wear, weathering, temperature or chemical corrosive effects, and destruction caused by the expansion of surface defects such as surface cracks formed during fabrication, may be formed of carbon atoms deposited thereon from gas, vapor or liquid molecules containing such carbon atoms, as a result of passing high intensity radiation, such as microwave radiation or the like, through such carbon atom containing fluids, by means shown and described in now U.S. Pat. No. 4,859,493, in thicknesses which may vary from a few millionths of an inch to a thousandth of an inch or more depending on the expected use of the articles or assemblies including the corrosive and erosive atmosphere to which they are subject. Thicker films in the order of 0.0001" to 0.001" or may may be provided to substantially enhance the tensile and compressive strengths of the articles or components. Where the article or component is subjected to movement and abrasion or frictional wear during use, which wear or abrasion may have a detrimental effect on the diamond film or coating, a thin coating of a solid lubricant protective material, such as chromium, chromium alloys or the like, may be applied over the diamond coating after it is formed in situ on the substrate or select portion of the outer surface thereof. Such chromium may also be deposited as chromium atoms present in the gas, vapor or liquid disposed adjacent the surface of the article, while carbon atoms are deposited or sequentially after the deposition of carbon atoms to provide either a composite layer or carbon and chromium atoms or one or more layers of carbon atoms interposed between one or more layers of chromium atoms or coatings thereof.

To protect the diamond films applied to the described electrodes and filaments from degrading effects which may occur during electrical energization and heating of the core elements thereof, thin overcoatings of metals such as chromium or other metals or metal alloys, glass or ceramic materials may be applied to the surface or select portions of the surface of the diamond film. Such overcoatings may be applied either thin enough or of a material which is transmissive of light or other form of radiant energy.

In certain article structures where the article or product is subject to substantial attrition, such as mechanical wear and high shear forces, it may be necessary to precoat the surface to receive the synthetic diamond film. Excellent adhesion of synthetic diamond film to metal and ceramic substrates may be derived by precoating the surface with silicon nitride ($Si_3N_4$).

In FIG. 3 is shown structural details of the synthetic diamond coatings, the protective overcoatings and the substrates coated. The substrate, which may be any of the configurations hereinabove described, is denoted 52 and is made of suitable metal, metal alloy, ceremet or ceramic material or combinations thereof fabricated by casting, molding, extrusion, machining, forging or one or more of such processes. The synthetic diamond coating 51 may be deposited as carbon atoms stripped from molecules of such gas as methane or other hydrocarbon, vaporous hydrocarbon or carbon atom containing material, combinations of gas and vapor carbon atom containing materials, preferably with suitable hydrogen gas mixed therewith to provide suitably efficient deposition and synthetic diamond layer formation to the desired thickness which may vary in the range of 0.000001" to 0.010" and, for most applications in the range of a few millions of an inch to a few thousandths of an inch. The overcoating 52 of chromium is shown completely covering the synthetic diamond coating 51 and may be applied by electroless or electrical deposition, vapor deposition, detonation or plasma plating. Thickness of depths of such overcoating may range from 0.0001 to several thousands of an inch or more and preferably in the range of a few thousands of an inch or less.

The substrate 52 of FIG. 3 may also be made of a number of materials other than metal, metal alloys or ceramic material as described. For certain applications involving the structures described it may be made of mixtures of ceramic or metal powder or a combination of both per se of mixed with short synthetic diamond filaments or particles shaped, dimensioned and and produced as set forth in my copending patent application Ser. No. 032,352 filed Mar. 31, 1987 now U.S. Pat. No. 4,960,643 providing a rigid matrix which is reinforced by such particles and, in certain applications, tailored in chemical and electrical characteristics to perform select functions as a high strength insulating, semiconducting or conducting material or as a heat conducting or insulating material, the surface or surfaces of which are protected from corrosion, erosion and frictional wear and failure due to forces applied thereto during operational use by either or both the coatings 50 and 51.

FIG. 3 may also represent a portion of a flexible substrate 52 made of a plastic resin such as a suitable polymer or copolymer; random or aligned fibers such as paper made from woodpulp or other material or woven material such as a cloth, canvas or reinforcement for a composite material such as a carbon-carbon having either or both major surfaces thereof coated with synthetic diamond material formed in situ thereon by chemical vapor deposition utilizing microwave energy to strip carbon atoms from molecules of a hydrocarbon liquid or gas such as methane by means such as described above and in my U.S. Pat. No. 4,960,643 and U.S. Pat. No. 4,859,493.

In a particular embodiment of the structure of FIG. 3 the substrate 52 may comprise a sheet of fibrous material such as paper or paperboard, canvas or the like having either or both the major surfaces thereof coated with a thin film of synthetic diamond material and having a valuable painting or print of art rendered on one of the surfaces thereof. The following forms of the invention are noted:

1. In a first form of the invention, the substrate 52 is a sheet of flexible or rigid fibrous material, such as paper or paperboard, canvas or the like containing printing material such as printing ink or painting material such as paint in the form of painting oils, acrylic or other material represented by the layer 51 which may or may not be absorbed into the surface stratum of substrate 51 as in most painted works of art. Layer 50 which is formed in situ and deposited on the outer surface of paint layer 51 or directly against the outer surface of substrate 52 is a thin film of synthetic diamond material which serves to protect the painting and the substrate from degradation due to atmospheric chemicals. The synthetic diamond material may be deposited as a thin transparent film in the range of thicknesses between 0.00001" to 0.0001" and is preferably, although not necessarily less than about 0.00001" in thickness. While the synthetic diamond film may be utilized per se to protect the outer surface of the painting from chemical attack and to prevent cracking of the paint as it ages, it may also be overcoated with a thin coating of a plastic resin such as a suitable polymer or copolymer which may be utilized to protect the outer surface of the diamond film from abrasion and reduce its possibility of failure therein such as cracking during handling or mounting same of a support. If fine voids or pin holes occur in such synthetic diamond film during its formation, such plastic film or coating may be employed to fill or cover such voids and strength and flexibility to the laminate without adversely affecting the painting or print. However, the synthetic diamond film may be utilized per se to protect substantially the entire painting or print from chemical degradation, particularly of such print or painting is supported in a frame behind a sheet of glass or rigid plastic.

2. In a second form of the invention a laminate is first formed of a sheet substrate 52 made of fibrous material such as paper, paperboard, canvas or the like and has one of its major surfaces 52S on which printed matter or a painting of value is to be made by an artist, coated with a thin layer or film 51 of synthetic diamond material formed in situ thereon as described by stripping carbon atoms from carbon atom containing molecules with microwave energy as described. The painting or print is then applied to the outer surface of the diamond film which may vary in thickness from a few millionths of an inch to a thousandth of an inch or more. A thin coating of clear or white colored plastic resin may be automatically applied to the outer surface of the diamond film onto the outer surface of which plastic may be printed or hand painted artwork or the like. The diamond film serves as a barrier against moisture and chemicals which may be present in or pass through the paper or paperboard substrate. After the painting or printed matter is completely applied to the outer surface of the first layer of synthetic diamond or a subsequent layer of plastic resin thereon, a second layer of synthetic diamond material is formed in situ against the outer surface of the painting or print completely covering all the printed matter or paint and exposed plastic of first layer of synthetic diamond laminating the paint or printed matter and hermetically sealing same therebetween.

3. In a third form of the invention a thin layer or film of synthetic diamond material is applied as described to the back of a sheet of paper, canvas or other suitable material either prior to or after printed matter or a painting has been formed on on the opposite surface thereof. Once the printed matter or paint forming a work of art has been so applied to the other surface of the sheet, a thin coating of synthetic diamond material is applied thereover including any exposed surface portion(s) of the sheet not printed or painted on. In other words, the entire other surface of the print or painting is coated with synthetic diamond material as described. The coating on the back side of the sheet seals the sheet itself from the atmosphere and moisture therein as well as any pollutants preventing same from adversely afffecting both the sheet or paper and the printed matter or paint on the other surface thereof. The synthetic diamond coating on the front face of the painting or print seals such surface and hermetically seals the painting, print and paper or canvas between itself and the synthetic diamond material coating the opposite side thereof. The outer surface of the thin layer of synthetic diamond material, which may be applied in the range of thicknesses described above to the outer surface of the painting or print may remain diamond film or may be overcoated with a thin layer of transparent plastic as described above to enhance the strength of the laminate and protect the diamond film. Such plastic layer may be a preformed sheet of clear plastic film such as a polyester resin, polycarbonate, polyamide or Nylon, etc.

In the print or painting preservation structures and techniques described above, synthetic diamond film and/or clear plastic film may be applied to the four edges of the paper or canvas sheet to coat or impregnate same in a manner to seal same from moisture and atmospheric gases to prevent same from penetrating the laminate from the edges thereof. Tightly clamping the print or painting betwen a glass sheet and a backing sheet may serve the same purpose and may be used to preserve the print or painting for an extremely long period of time. Painting or printing on diamond film applied to a face of a sheet material will not only protect the paint or ink from interacting with chemicals in the paper or base sheet or with chemicals and moisture penetrating said sheet from the rear, but will also strengthen such sheet material and limit or prevent its stretching to the determent of the painting or print applied thereto.

4. In a fourth form of the invention, a laminate of a print or painting and one or more sheets of plastic and/or glass sheet may have its entire outer surfaces coated with synthetic diamond material as described, thereby sealing such laminate in synthetic diamond material against moisture and atmospheric molecule penetration. If the laminate or a portion thereof is made of a porous material containing atmospheric molecules accessible to the surface(s) of the laminate, it may be placed in a chamber which may be evacuated of air just prior to application of the synthetic diamond coating which may be formed of atoms of carbon stripped from molecules of a hydrocarbon gas controllably fed into the vacuum chamber along with suitable hydrogen to the exclusion of contaminants such as air or other molecules until the coating process is complete.

A number of techniques and apparatus may be employed to coat paintings, prints and the like with synthetic diamond. In one, a waveguide for suitable microwave energy is automatically driven in controlled scanning movement across a surface of the painting, print or sheet while methane or other suitable hydrocarbon gas is flowed into the guide against the surface of the painting and suitable microwave energy is generated and passed through the guide to cause carbon atoms of the gas to be stripped from the gas molecules and deposited onto the surface of the painting or paper until predetermined coating is completed. In a second technique, the painting, print or its laminate as described above is placed and either held stationary or contollably moved in a coating chamber into which hydrocarbon gas (such as methane) is controllably flowed while suitable microwave energy is generated and directed against all or a selected location of the painting. In a third form, the microwave energy generator is moved or controlled to cause microwave energy to scan the sheet causing the scanning deposition of carbon atoms as synthetic diamond film on incremental portions of the painting or sheet. In a forth arrangement, the sheet, painting or print is rolled into a loose coil formation with suitable spacing between surface portions to allow methane gas or the like to be flowed through such spacing while microwave energy is directed against the coil formation to deposit carbon atoms as a film of synthetic diamond material of select thickness.

The substrate 52 may comprise a variety of natural or synthetic flexible materials such as paper, plastic sheet or film, parchment, canvas, leather, woven fabrics metal foils, laminates of such materials or such sheet materials coated with a suitable plastic layer or film against the outer surface of which the synthetic plastic material may be deposited as a thin film. Such laminates of flexible substrate sheet, and a plurality of coatings thereon including a first layer of plastic if needed to render the surface of the substrate non-porous, a layer of synthetic diamond material on the surface of the substrate or plastic coating thereon and an overcoating of flexible colored or transparent plastic or preformed plastic film, may be utilized to provide flexible material for a variety of produce in which the synthetic diamond coating addes substantially to the strength and abrasion resistance. If the overcoating of plastic is omitted, the synthetic diamond layer itself may serve to offer great resistance to wear and scuffing or abrasion, add to the total strength of the flexible laminate and, in certain applications, serve as a heat insulating layer.

Coatings of synthetic diamond or diamond-like material may be applied to paper products such as valuable paintings, prints and the like as well as cetain polymers using radiation in the range of 200–300 degrees F. while the sheet material is in motion of stationary. Such coatings may be applied to a depth of 0.000001 to 0.00001" or greater.

Certain modifications to the structures and methods for making same may be found in my parent application now U.S. Pat. No. 4,859,493 and in pending patent application Ser. No. 032,352 filed Mar. 31, 1987, now U.S. Pat. No. 4,960,643, reference being made directly thereto as part of the instant disclosure. Further modifications are noted as follows:

1. Scanning a select portion or portions of the surface or surfaces of the articles described and illustrated in the drawings with one or more radiation beams of laser and/or electron radiation may be effected to provide such coating or coatings on a select area or areas of the outer surface or surfaces of the articles to the exclusion of another area or areas thereof for functional and/or economic purposes. Such an electon beam or laser beam may be employed in combination with microwave radiation and passed through a carbon atom containing gas, such as methane, surrounding all or part of the article or assembly to be coated, and employed to effect or increase the rate of deposition of carbon atoms to form the synthetic diamond coating and/or to the heat the substrate to bond the deposited material(s) to the substrate.

2. Such functions as the operation of the radiation beam generating means, the intensity and frequency thereof, if varied, the direction and focus thereof, the flow and replenishment of carbon atom containing gas and hydrogen gas to the reaction chamber and, if employed, flow thereof as one or more streams within such chamber to the vicinity of the surface(s) being coated, the movement and/or prepositioning of the article or material being coated to, within and from the reaction chamber and the flow of any additional material, to be combined with the carbon atoms in the coating, to the reaction chamber and surface of the article(s) being coated, may all be automatically controlled by a computer with or without the generation of feedback signals generated by one or more sensors of such variables as deposited coating thickness, rate of deposition, temperature, beam position, article position, etc.

3. Synthetic diamond coatings as described may be overcoated with protective coatings of chromium, alloys containing chromium, metal alloys containing such metal atoms as vanadium, tungsten, titanium, molybdenum and/or such metals per se, which serve to protect and/or lubricate the surface of the synthetic diamond coatings to resist frictional wear and abrasion during operation and use of the coated article. In certain applications, the synthetic diamond coating will serve to electrically insulate the article. In others, it will protect the surface coated therewith from heat and/or chemical corrosion. In others, the surface(s) coatings will impart greater resistance to wear and abrasion. Surface attrition due to impact forces and loading during use may also be lessened or eliminated by such hard synthetic diamond coating(s) which may be applied as a single or plurality of layers per se or combined or overcoated with one or more layers of the described metals and/or metal alloys to lubricate and protect the surface of the synthetic diamond coating.

4. Coatings formed of a plurality of layers of synthetic diamond material formed as described between respective layers of the same or different metals, metal alloys and/or ceramic materials may be employed to enhance the physical, chemical resistance and electrical characteristics of the articles described. Such multiple coatings may also be employed to substantially enhance the strength and stiffness of the articles.

5. In coating large areas, such as sheets, prints, paintings or the like as described above. The sheet may be held stationary while a coating head which applies microwave energy and gas or vapor containing hydrocarbon molecules with carbon atoms to be deposited and formed into diamond film is controllably driven across the support for such deposition had. The sheet may be supported by flat bed or drum which is driven to effect all or partial scanning during the coating operation. The movement of the deposition head and/or the platen as well as control of the pump or other means flowing the carbon atom containing gas or vapor as a stream or streams to the surface of the sheet and the generation of microwave energy, may all be under the control of a computer with or without the generation of feedback signals generated in sensing such movements, flow or flows and radiation as well as the thickness of the film formed in situ on the surface of the sheet. Such feedback signals may be employed to effect accurate control of such variables and assure coatings of uniform thickness across sheet or shape being coated with the one or more materials.

6. In a further embodiment, extrusions of sheets or other structural shapes, filaments, tubing or the like may be continuously coated as or shortly after they are formed, on the fly or while temporarily held stationary, by suitable radiation generating means, such as a microwave generator and a source of flowable carbon atom containing fluid disposed downstream of the extruder or elongated material supplying apparatus. Such apparatus may be disposed in a coating chamber with a controlled atmosphere or from which air is evacuated to avoid unwanted contamination of the deposited film or coating(s).

7. In a preferred mode of automaic control, the thickness or depth of the layer being deposited is sensed by a suitable sensing device or devices which generates output electrical analog signals which are digitized and analyzed in real time by a computer to generate control signals which are employed to control such process variables as (a) rate of flow of one or more gases and/or vapors containg atoms or molecules to be deposited, (b) initiation and termination of the generation of suitable radiant energy such as microwave, laser, plasma or other form of energy, (c) relative movement between the substrate being coated and the coating and radiation generating head or heads. Such coating head or heads may be driven in two axis movement under computer control, moved back and forth in scanning a sheet while the latter is driven at a controlled rate in a given direction such as from a coil supply thereof or a contunuous forming means such as an extruder.

8. Filaments or tubes of glass, ceramic or other material may be continuously coated while in movement past one or more radiation generators as described wherein diamond film and one or more other films are applied to the exterior surface or surfaces thereof and, where the extrusion or shape is a tube, on the inside surface thereof. Tubular or solid glass fibers, or bundles may be externally coated with synthetic diamond material formed in-situ thereon as described, with or without an undercoating and or and overcoating as decribed, to form light pipes thereof which may be employed in optical communication and various optical and electro-optical devices. Synthetic diamond coatings on such filaments, bundles or tubes will have superior strength and resistence to chemical corrosion and breakage due to flexure. The synthetic diamond films may vary in thickness from a few millionths of an inch to a thousandth of an inch or greater.

9. The coating techniques and coating structures illustrated and described above may also be employed in the manufacture of a variety of electrical devices such as discrete components and entire microelectronic circuits such as microchips containing intergrated and multilayer circuits formed, for example on chips made of silicon or other material. The entire circuits so formed fabricated is coated with a thin diamond or diamond-like film as desribed with the exception that a select portion or portions of the surface or surfaces of the circuit or circuit device to which leads and/or discrete surface mount components are to secured or be attached and electrically connected to are maintained free of such synthetic diamond material.

What is claimed is:

1. An electrical device comprising:
   a) a support,
   b) a filament having a metal core portion,
   c) a light transmitting envelope secured to said support and forming a closure therewith,
   d) input means for electrical energy secured to said support and connected to said filament,
   e) said metal core portion of said filament being coated with a synthetic diamond material which is operable to protect the metal of said filament from heat corrosion during the resistance heating of said filament when electrical energy is conducted to said input means and to said metal of said filament.

2. A device in accordance with claim 1 wherein said synthetic diamond material is coated on the entire surface of said metal core portion of said filament which is exposed to the enclosed volume defined by said assembled envelope and said support.

3. A device in accordance with claim 2 wherein said filament is made of tungsten and said synthetic diamond material is operable to prevent the tungsten of said filament from evaporating and failing due to the loss of atoms of tungsten when resistively heated by electrical energy passed therethrough.

4. A device in accordance with claim 1 wherein said filament is made of copper.

5. A device in accordance with claim 1 in the form of an incandescent lamp wherein said filament is operable to glow and discharge light energy when electrically energized with electrical energy passed therethrough from said input means, said coating of synthetic diamond material serving to protect the metal of said filament from heat corrosion destruction when it is resistively heated as a result of electrical energy passing therethrough during the electrical energizing of said device, said coating of synthetic diamond being transmissive of light energy generated during the glow discharge of the metal of said filament.

6. A device in accordance with claim 1 wherein the metal of said filament is operable when electrical energy is passed therethrough from said input means to generate radiant energy, said coating of synthetic diamond material operable to receive and transmit therethrough to the volume defined by said envelope at least part of the radiant energy generated when electrical energy is passed through said filament.

7. A device in accordance with claim 1 wherein said synthetic diamond material is formed in situ on the entire outer surface of said filament exposed volume defined by said envelope and said support as a coating having a thickness in the range of 0.00001" to 0.001".

8. An electrical device comprising:
   a) a housing defined by a support and a light transmitting wall portion defining an enclosure with said support,
   b) an electrode secured to said support and having a core made of electrically conducting material, said electrode core being operable to be resistively heated and generate radiant energy when electrical energy is passed therethrough,
   c) a synthetic diamond material coating said core of said electrode,
   d) input means for electrical energy secured to said support and connected to said core to permit electrical energy received thereby to be passed to said core,
   e) said synthetic diamond material being operable to receive and transmit said radiant energy from said core to the volume defined by said enclosure and through said light transmitting wall portion of said housing, f) said coating of said synthetic diamond material also serving to protect said core from corrosion and evaporation of the material thereof during the electrical energization of said electrical device.

9. An electrical device in accordance with claim 8 wherein said synthetic diamond material coating said core has a uniform thickness about said core in the range of 0.00001" to 0.005".

10. A device in accordance with claim 8 wherein said synthetic diamond material coating said core has a thickness less than 0.001".

11. An electrical device in accordance with claim 8 wherein said electrode is in the shape of a single filament and is formed of metal selected from the group of metals including tungsten, copper, aluminum, titanium and alloys thereof.

12. An electrical device in accordance with claim 8 having at least part of one of said input means secured to said support exposed to the atmosphere, said exposed portion of said input means being coated with synthetic diamond material to protect said input means against atmospheric corrosion and arcing erosion.

13. An electrode for use in an electrical device comprises a core made of electrically conducting material and a coating of synthetic diamond material surrounding a select portion of said core leaving the remainder of said core void of synthetic diamond coating material in order to facilitate the discharge of an electrical arc therefrom, a support, and an electrically conducting input means supported by said support and connected to said core for conducting electrical energy to said core, at least part of said input means being coated with synthetic diamond material.

14. An electrical device comprising in combination:
a) a support,
b) a plurality of electrical terminal means supported by said support,
c) a thin sheet-like envelope secured to said support and defining an enclosed volume void of air,
d) electrical insulating material secured to said support
e) a plurality of metal filament supports secured to said support and said insulating material which insulates the filament supports from each other, said electrical terminal means being respectively electrically connected to respective said filament supports,
f) said electrical terminal means extending into the air evacuated volume defined by the assembly of said envelope and said support,
g) a length of resistence filament material supported by said metal filament supports,
h) a layer of synthetic diamond material secured to and defining a protective coating on said length of resistence filament material,
i) said synthetic diamond material being transparent to radiant energy generated when said length of resistence filament material is electrically energized and being operable to protect said length of resistence filament material from erosion and heat corrosion.

15. An electrical device in accordance with claim 14 wherein select portions of said metal filament supports are coated with synthetic diamond material.

16. An electrical device in accordance with claim 14 wherein said envelope is a thin walled glass bulb, the entire portions of said metal filament supports and the length of resistence filament material supported thereby which are exposed to radiation generated when said filament is electrically energized being coated with said synthetic diamond material.

17. An electrical device in accordance with claim 14 wherein said metal filament supports are made of short lengths of metal wire.

18. An electrical device in accordance with claim 14 wherein said length of resistence filament material has a conducting core selected from the group of materials including tungsten, titatnium, copper, nickle, chromium, vanadium, aluminum and alloys thereof as well as high strength carbon having a diameter less than 0.08" and wherein said layer of synthetic diamond material serves to strength said length of resistence filament material and prevent its failure due to shocks and flexure of said length of resistence filament material during handling and use of said device.

* * * * *